United States Patent
Nakanishi et al.

(10) Patent No.: US 11,296,553 B2
(45) Date of Patent: Apr. 5, 2022

(54) NON-CONTACT POWER FEEDING SYSTEM AND POWER RECEPTION DEVICE

(71) Applicant: Mitsubishi Electric Corporation, Tokyo (JP)

(72) Inventors: Takuya Nakanishi, Tokyo (JP); Mariko Shiozaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/287,998

(22) PCT Filed: Dec. 19, 2018

(86) PCT No.: PCT/JP2018/046774
§ 371 (c)(1),
(2) Date: Apr. 23, 2021

(87) PCT Pub. No.: WO2020/129178
PCT Pub. Date: Jun. 25, 2020

(65) Prior Publication Data
US 2021/0399583 A1  Dec. 23, 2021

(51) Int. Cl.
*H02J 50/80* (2016.01)
*H02J 50/12* (2016.01)
(Continued)

(52) U.S. Cl.
CPC ............ *H02J 50/12* (2016.02); *H02J 50/80* (2016.02); *H02M 7/219* (2013.01); *H02M 7/5387* (2013.01)

(58) Field of Classification Search
CPC .......... H02J 50/12; H02J 50/80; H02M 7/219; H02M 7/5387
See application file for complete search history.

(56) References Cited

U.S. PATENT DOCUMENTS

| 10,063,104 B2* | 8/2018 | Kurs | ....................... B60L 53/12 |
| 2015/0357863 A1* | 12/2015 | Sadakata | ................. H02J 5/005 |
| | | | 320/108 |

(Continued)

FOREIGN PATENT DOCUMENTS

| EP | 2 985 846 A1 | 2/2016 |
| JP | 2016-116365 A | 6/2016 |

(Continued)

OTHER PUBLICATIONS

International Search Report and Written Opinion dated Jan. 29, 2019, received for PCT Application PCT/ JP2018/046774, Filed on Dec. 19, 2018, 8 pages including English Translation.

(Continued)

*Primary Examiner* — Jared Fureman
*Assistant Examiner* — Michael J Warmflash
(74) *Attorney, Agent, or Firm* — Xsensus LLP

(57) ABSTRACT

In a non-contact power feeding system for transmitting/receiving power, by magnetic coupling, between a coil connected to a transmitting side DC/AC conversion circuit and a coil connected to a receiving side AC/DC conversion circuit so as to supply power from a power supply to a load, voltage control for the load is performed by the transmitting side DC/AC conversion circuit, and control of current that flows to a capacitor connected to an output side of the receiving side AC/DC conversion circuit is performed by the receiving side AC/DC conversion circuit. Accordingly, coil to coil efficiency in a case of low load can be enhanced without the need for any additional circuit.

13 Claims, 17 Drawing Sheets

(51) Int. Cl.
*H02M 7/219* (2006.01)
*H02M 7/5387* (2007.01)

(56) References Cited

U.S. PATENT DOCUMENTS

2018/0097351 A1   4/2018  Jha et al.
2018/0123397 A1*  5/2018  Tsukiyama .............. H02J 50/12

FOREIGN PATENT DOCUMENTS

JP    2017-93094 A    5/2017
JP    2018-14884 A    1/2018
JP    2018-74792 A    5/2018

OTHER PUBLICATIONS

Extended European Search Report dated Jan. 4, 2022 in European Patent Application No. 18943445.9.

* cited by examiner

MODE 1

MODE 2

MODE 3

MODE 4

MODE 5

| LOAD CURRENT | ON DUTY |
| --- | --- |
| 1A | 20% |
| 2A | 15% |
| 3A | 10% |
| 4A | 5% |

NON-CONTACT POWER FEEDING SYSTEM AND POWER RECEPTION DEVICE

CROSS-REFERENCE TO RELATED APPLICATION

The present application is based on PCT filing PCT/JP2018/046774, filed Dec. 19, 2018, the entire contents of which are incorporated herein by reference.

TECHNICAL FIELD

The present disclosure relates to a non-contact power feeding system.

BACKGROUND ART

There have been non-contact power feeding technologies of transmitting power by magnetic field coupling between two coils separated from each other. Development of this magnetic field coupling type non-contact power feeding has been progressing in order to apply the power feeding to non-contact chargers for electric vehicles (EVs)/plug-in hybrid electric vehicles (PHEVs). However, this non-contact power feeding has a problem in that transmission efficiency decreases owing to change in an impedance based on positions between coils, feeding power, or the like. In order to solve this problem, various technologies of adjusting the change in the impedance have been developed (for example, Patent Document 1).

CITATION LIST

Patent Document

Patent Document 1: Japanese Laid-Open Patent Publication No. 2017-93094

SUMMARY OF THE INVENTION

Problems to be Solved by the Invention

In the non-contact power feeding, coil to coil efficiency decreases at the time of transmission of a power lower than a rated power. In the above-described Patent Document 1, two operations which are power control and improvement of transmission efficiency are performed by using two power converters which are a power converter 21 and a power converter 22 in order to adapt to low-power transmission. However, the addition of the power converter 22 poses problems of increase in power loss, increase in a disposition volume, and increase in cost.

The present disclosure has been made to solve the above-described problems, and an object of the present disclosure is to enhance coil to coil efficiency in a case of low load without any additional circuit.

Solution to the Problems

A non-contact power feeding system according to the present disclosure includes:
  a transmitting side DC/AC conversion circuit connected to an external power supply;
  a first coil connected to the transmitting side DC/AC conversion circuit;
  a second coil which transmits/receives power to/from the first coil by magnetic coupling;
  a receiving side AC/DC conversion circuit connected to the second coil;
  a capacitor connected to a DC output side of the receiving side AC/DC conversion circuit;
  a current sensor which measures current flowing to a load connected to the capacitor;
  a voltage sensor which measures a voltage of the connected load; and
  a communication device which transmits an output from the voltage sensor, to the transmitting side DC/AC conversion circuit, wherein
  the transmitting side DC/AC conversion circuit performs control such that the voltage of the load falls within a predetermined range, and
  the receiving side AC/DC conversion circuit performs, while the voltage of the load is being controlled to be within the range, control so as to generate a period during which current to the capacitor is 0, according to the current flowing to the load.

Effect of the Invention

In the non-contact power feeding system according to the present disclosure, control of the voltage of the load is performed by the transmitting side DC/AC conversion circuit, and control of the current to flow to the capacitor is performed by the power receiving side AC/DC conversion circuit according to the current flowing to the load. Consequently, coil to coil efficiency in a case of low load can be enhanced without the need for any additional circuit.

BRIEF DESCRIPTION OF THE DRAWINGS

FIG. 5 is a waveform diagram indicating an input voltage waveform and an input current waveform to a power-reception-side AC/DC conversion circuit 5 in the case where a semiconductor switch of the power-reception-side AC/DC conversion circuit is not turned on.

FIG. 6 is a waveform diagram indicating an input voltage waveform and an input current waveform to the power-reception-side AC/DC conversion circuit 5 in the case where the semiconductor switch of the power-reception-side AC/DC conversion circuit is turned on.

DESCRIPTION OF EMBODIMENTS

Figure 1:
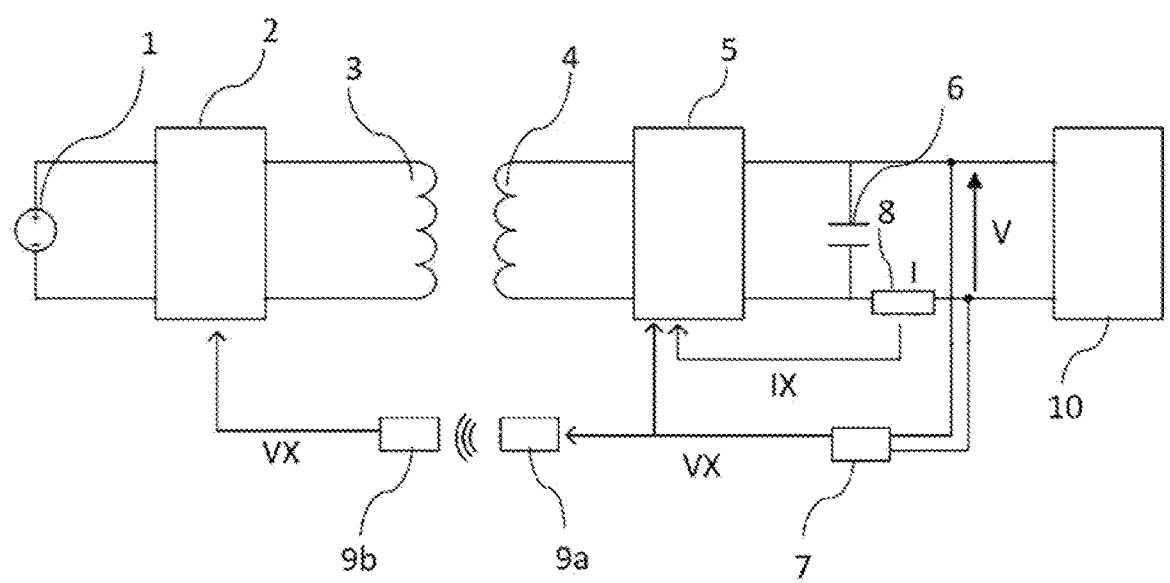
FIG. 1 illustrates the entire configuration of a non-contact power feeding system according to embodiment 1.

Hereinafter, non-contact power feeding systems according to preferred embodiments of the present disclosure will be described with reference to the drawings. It is noted that the same components and corresponding parts are denoted by the same reference characters, and detailed description thereof will be omitted. Also in the other embodiments, the constituents denoted by the same reference characters will not be repetitively described.

Embodiment 1

[Basic Configuration]

A basic configuration of a non-contact power feeding system according to embodiment 1 will be described. FIG. 1 illustrates the entire configuration of the non-contact power feeding system. The non-contact power feeding system includes: a transmitting side DC/AC conversion circuit 2 connected to a DC power supply 1; a coil 3 (first coil) which transmits/receives power by magnetic coupling to another coil; a coil 4 (second coil) which transmits/receives power by magnetic coupling to the coil 3; a receiving side AC/DC conversion circuit 5 to which the coil 4 is connected; an output capacitor 6 connected in parallel to a load 10 at an output from the receiving side AC/DC conversion circuit 5; a voltage sensor 7 which measures a load voltage V; a current sensor 8 which measures a load current I; and wireless communication modules 9a and 9b which transmit load voltage information VX to the transmitting side DC/AC conversion circuit 2.

Figure 2A:
FIGS. 2A, 2B and 2C are diagrams for explaining an example of connection of resonance capacitors connected to coils.
Figure 2B:
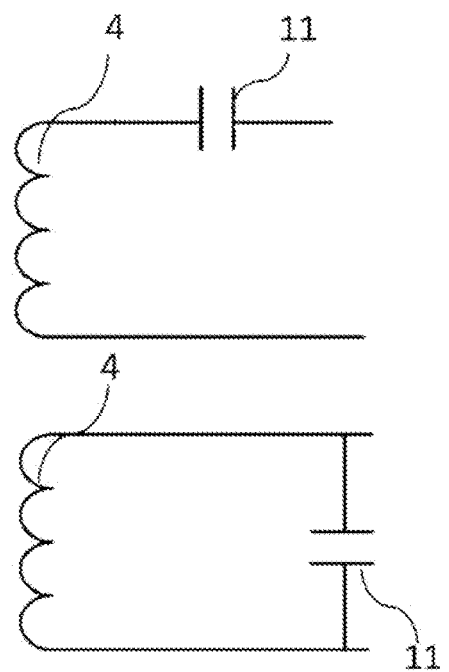
Figure 2C:
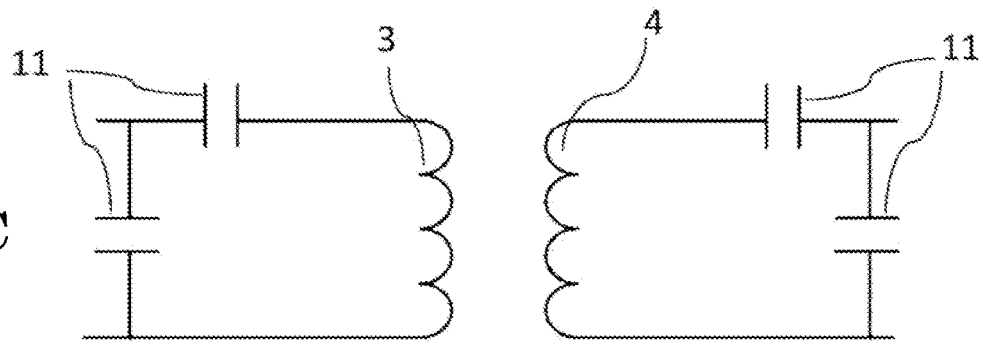

As shown in FIG. 2A, resonance capacitors 11 may be connected in series to the coil 3 and the coil 4. Alternatively, as shown in FIG. 2B, the resonance capacitors 11 may be connected in parallel to the coil 3 and the coil 4. Alternatively, as shown in FIG. 2C, resonance capacitors 11 may be connected in series and parallel to the coil 3 and the coil 4.

Figure 3:
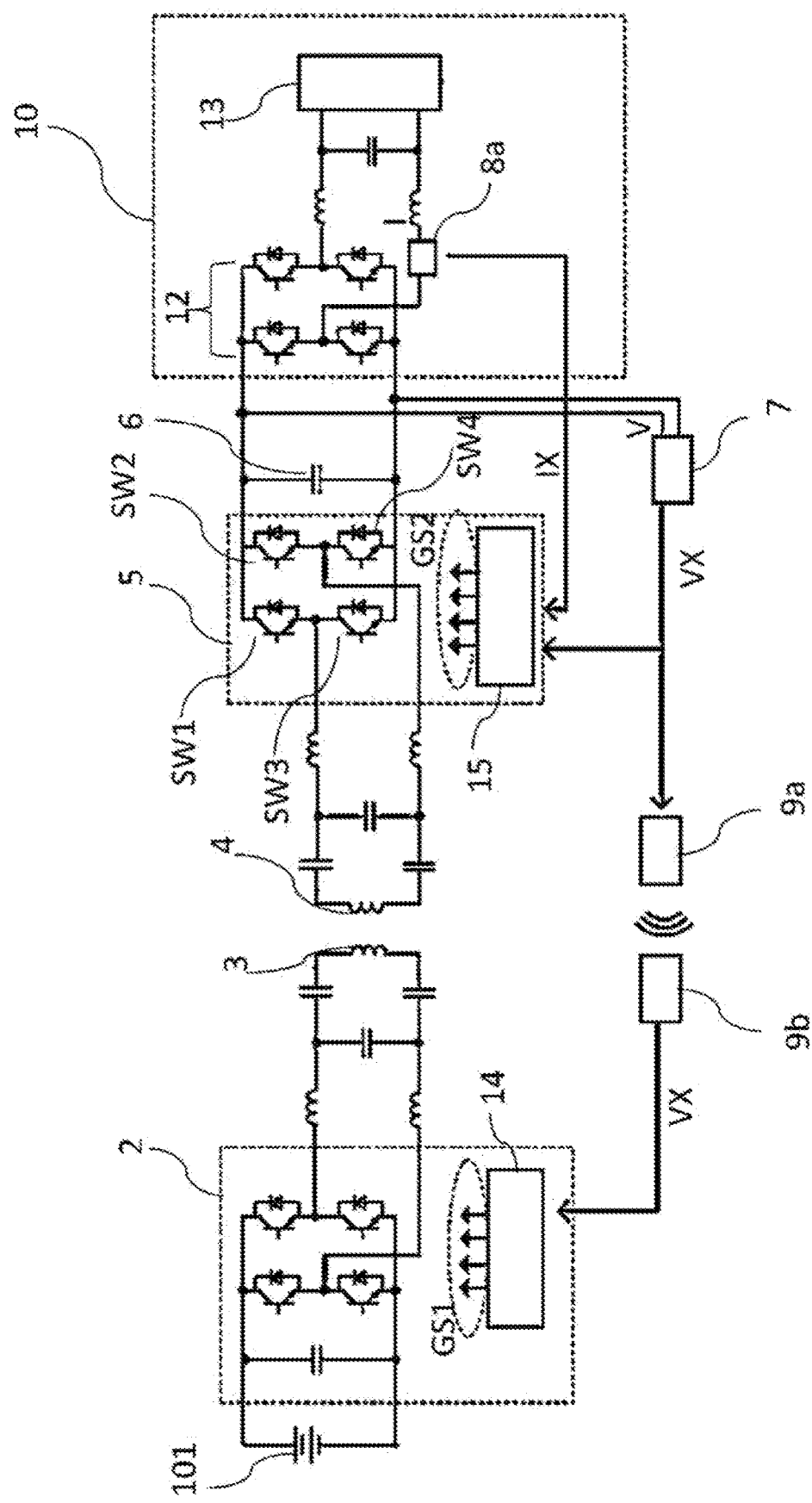
FIG. 3 illustrates a specific configuration in the case where the non-contact power feeding system according to embodiment 1 is mounted to a vehicle.

FIG. 3 indicates a specific configuration in the case where the non-contact power feeding system is mounted to a vehicle. An electric automobile on-board battery 101 as the DC power supply 1, the transmitting side DC/AC conversion circuit 2, and the coil 3 are mounted in the vehicle. The coil 4, the receiving side AC/DC conversion circuit 5, the output capacitor 6, and the load 10 are equipment on the ground side. Here, in the load 10, a DC/AC conversion circuit 12 which outputs AC power at 50 Hz or 60 Hz is connected, and an arbitrary electrical device 13 such as an air conditioner or a lighting is connected to the DC/AC conversion circuit 12. The transmitting side DC/AC conversion circuit 2 and the receiving side AC/DC conversion circuit 5 each have a full-bridge configuration including semiconductor switches such as field effect transistors (FETs) or insulated gate bipolar transistors (IGBTs). In this explanation, the terms "transmitting side" and "receiving side" are determined on the basis of the state where power is supplied from the on-board battery 101 to the ground side. Although detection of the load current I is performed by a current sensor 8a inside the DC/AC conversion circuit 12 which outputs AC power at 50 Hz or 60 Hz, the current sensor 8a may be used inside the load 10 but outside the DC/AC conversion circuit 12, or, as shown in FIG. 1, the current sensor 8 may be separately provided outside the load 10. Control of semiconductor switches of the transmitting side DC/AC conversion circuit 2 is performed by a control device 14, and control of semiconductor switches SW1 to SW4 of the receiving side AC/DC conversion circuit 5 is performed by a control device 15.

Figure 4:
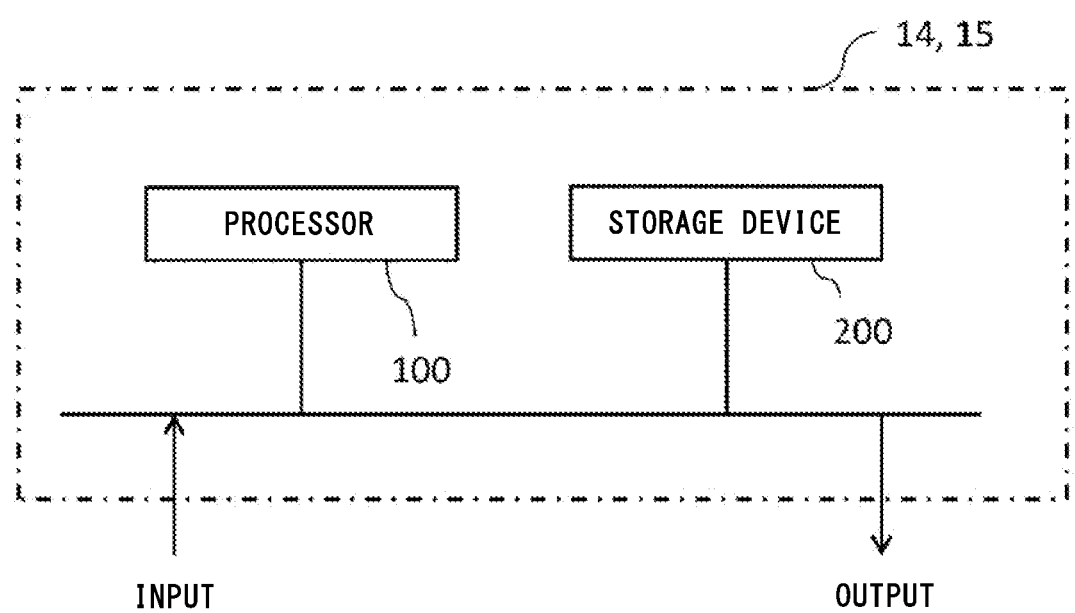
FIG. 4 illustrates a hardware configuration of each of control devices in embodiment 1.

An example of the hardware configuration of each of the control device 14 and the control device 15 is shown in FIG. 4. The hardware includes a processor 100 such as a microcomputer and a storage device 200. Although not shown, the storage device 200 includes a volatile storage device such as a random access memory and a nonvolatile auxiliary storage device such as a flash memory. Alternatively, the storage device 200 may include, as the auxiliary storage device, a hard disk instead of a flash memory. The processor 100 executes a program inputted from the storage device 200 and executes a part or the entirety of the control of the above-described semiconductor switches. In this case, the program is inputted from the auxiliary storage device via the volatile storage device to the processor 100. In addition, the processor 100 may output data such as a calculation result to the volatile storage device of the storage device 200, or may save the data via the volatile storage device to the auxiliary storage device. Further, a logic circuit and an analog circuit may be used together in addition to the processor 100 and the storage device 200.

[Basic Operations]

Basic operations of the non-contact power feeding system according to the present embodiment will be described. Here, a case will be described in which power is supplied from the on-board battery 101 to the arbitrary electrical device 13 on the ground side in a house or the like.

[Operation 1]

DC power is supplied from the on-board battery 101 which is the DC power supply 1. The semiconductor switches in the transmitting side DC/AC conversion circuit 2 are switched by a gate signal GS1 from the control device 14, whereby a conversion operation from DC to AC is performed and AC voltage is applied to the coil 3. At this time, the frequency of the applied AC voltage is, for example, 80 kHz to 90 kHz. This description about the frequency is merely an example and is not intended to restrict the frequency for application.

If AC voltage is applied to the coil 3, an AC magnetic field is generated around the coil 3. The AC magnetic field interlinks with the coil 4 so that induced electromotive force is generated to the coil 4, whereby power is supplied to the coil 4 via the AC magnetic field. AC power from the coil 4 is rectified by switching the semiconductor switches SW1 to SW4 in the receiving side AC/DC conversion circuit 5 by a gate signal GS2 from the control device 15, and the post-rectification output is smoothed by the output capacitor 6, to be converted into DC power. The DC/AC conversion circuit 12 of the load 10 generates an AC voltage of 200V at 50 Hz or 60 Hz and supplies AC power to the arbitrary electrical device 13.

[Operation 2]

While the above-described operation 1 is being performed, a load voltage V which is the voltage between both ends of the output capacitor 6 is detected by the voltage sensor 7, and load voltage information VX is transmitted to the receiving side AC/DC conversion circuit 5 and the transmitting side DC/AC conversion circuit 2. The load voltage information VX is transmitted to the transmitting side DC/AC conversion circuit 2 by the wireless communication modules 9a and 9b.

The transmitting side DC/AC conversion circuit 2 controls the load voltage to take a fixed value (here, 380V) on the basis of the load voltage information VX received by the wireless communication module 9b. Here, the control to be performed by the transmitting side DC/AC conversion circuit 2 includes, for example, phase shift control in which a voltage command value is set to 380V and the load voltage is controlled by the control device 14 to be fixed through manipulation of a phase shift amount from the difference between the voltage command value and the load voltage information VX which has been fed back.

[Operation 3]

If the value of an output voltage $V_O$ from the receiving side AC/DC conversion circuit 5 is 380V or within a predetermined voltage range, e.g. if $V_O$ is within a range of 375V to 385V, as a result of the above-described control, the control device 15 executes the following control.

At least one of the semiconductor switches of the receiving side AC/DC conversion circuit 5 is turned on. The at least one of the semiconductor switches is a semiconductor switch that causes, when turned on, current to the output capacitor 6 to be 0. In the present embodiment, the semiconductor switch is the semiconductor switch SW1.

Figure 5:
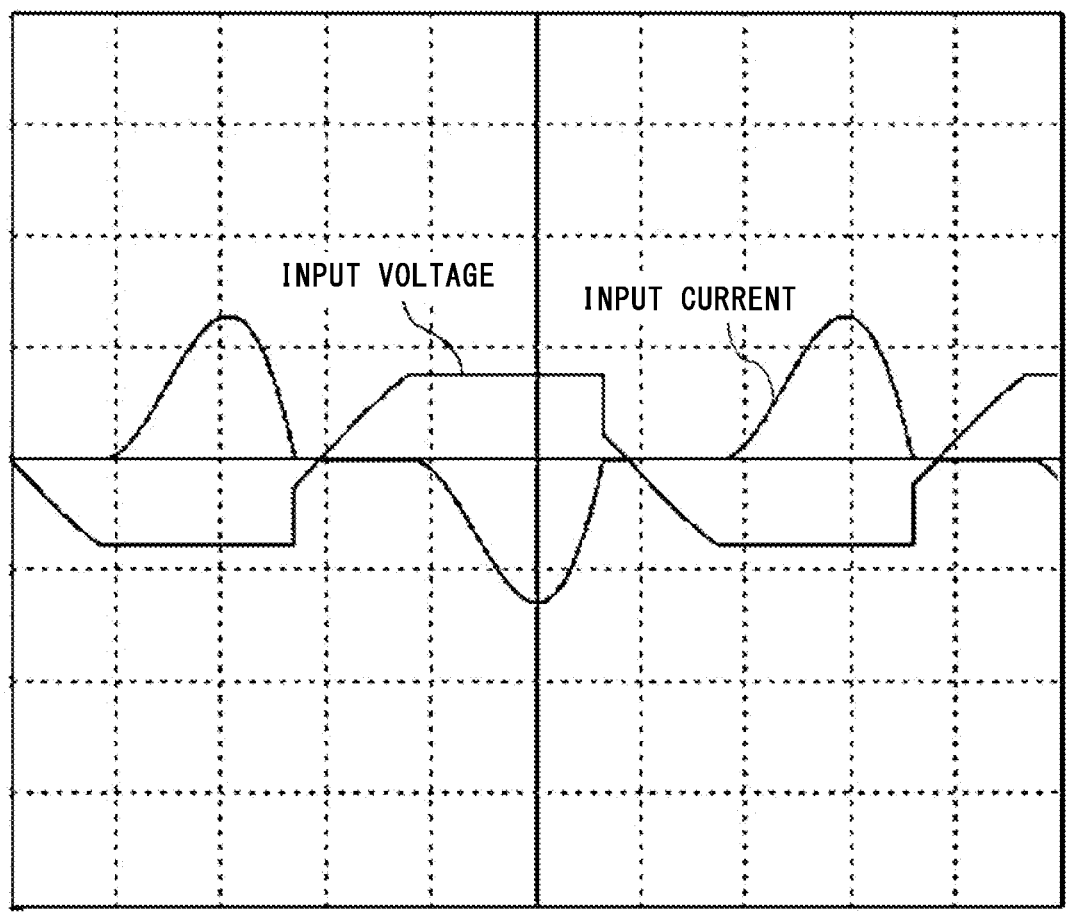
Figure 6:
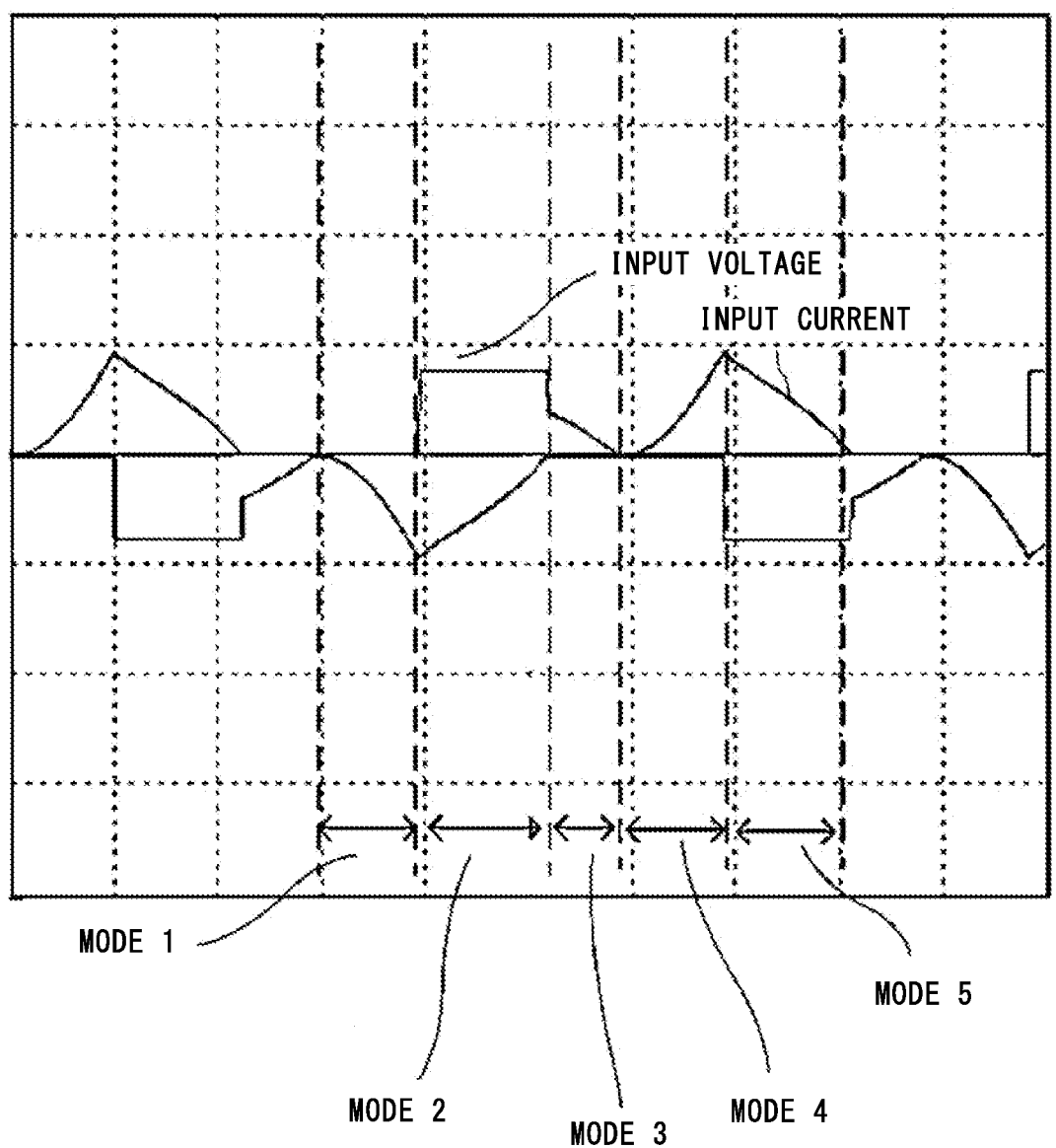

For explanation of this control, FIG. 5 indicates an input voltage waveform and an input current waveform to the receiving side AC/DC conversion circuit 5 in the case where the semiconductor switch of the receiving side AC/DC conversion circuit 5 is not turned on, and FIG. 6 indicates an input voltage waveform and an input current waveform thereto in the case where the semiconductor switch of the receiving side AC/DC conversion circuit 5 is turned on. In addition, FIG. 7 to FIG. 11 indicate ON and OFF operation states of the semiconductor switches SW1 to SW4 of the receiving side AC/DC conversion circuit 5 and flows of input current, in respective modes shown in FIG. 6.

Figure 7:
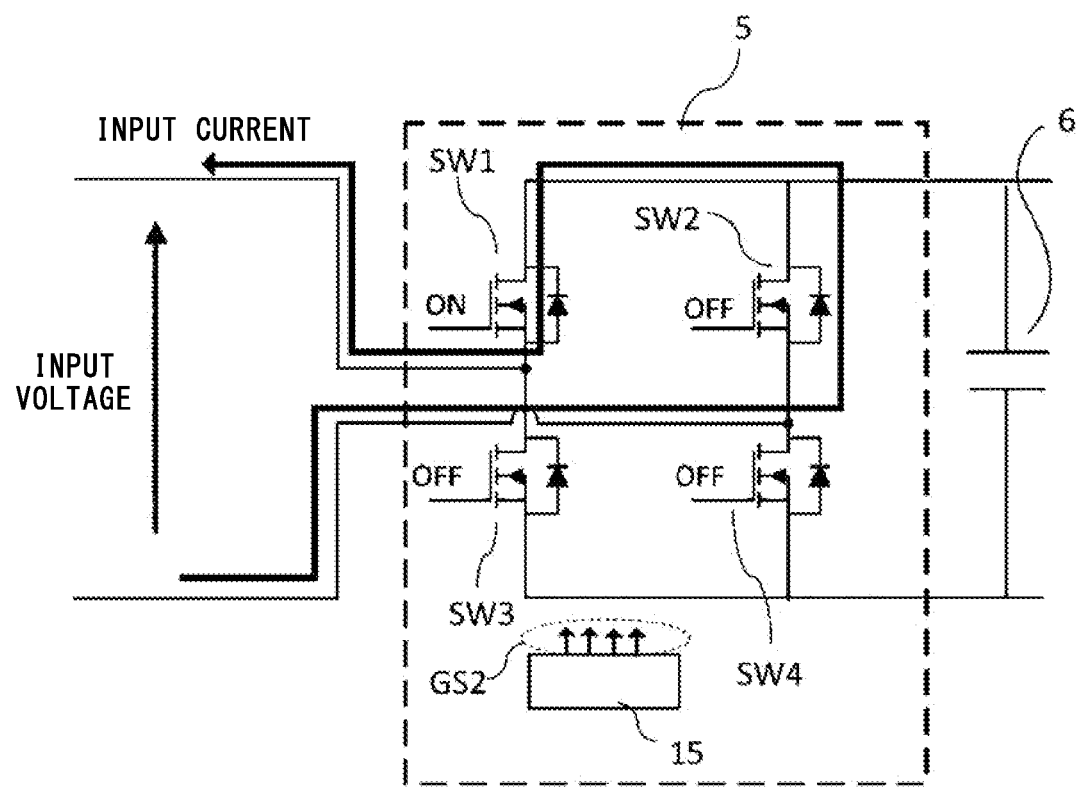
FIG. 7 illustrates operation states of semiconductor switches and a flow of input current, in mode 1 in FIG. 6.

During a period of operation in mode 1 in FIG. 6, the semiconductor switch SW1 of the receiving side AC/DC conversion circuit 5 is, as shown in FIG. 7, turned on to cause short circuiting for current from the coil 4 so that the input voltage is set to 0V. Thus, the current flows in the direction indicated by the arrow, but does not flow to the output capacitor 6.

Figure 8:
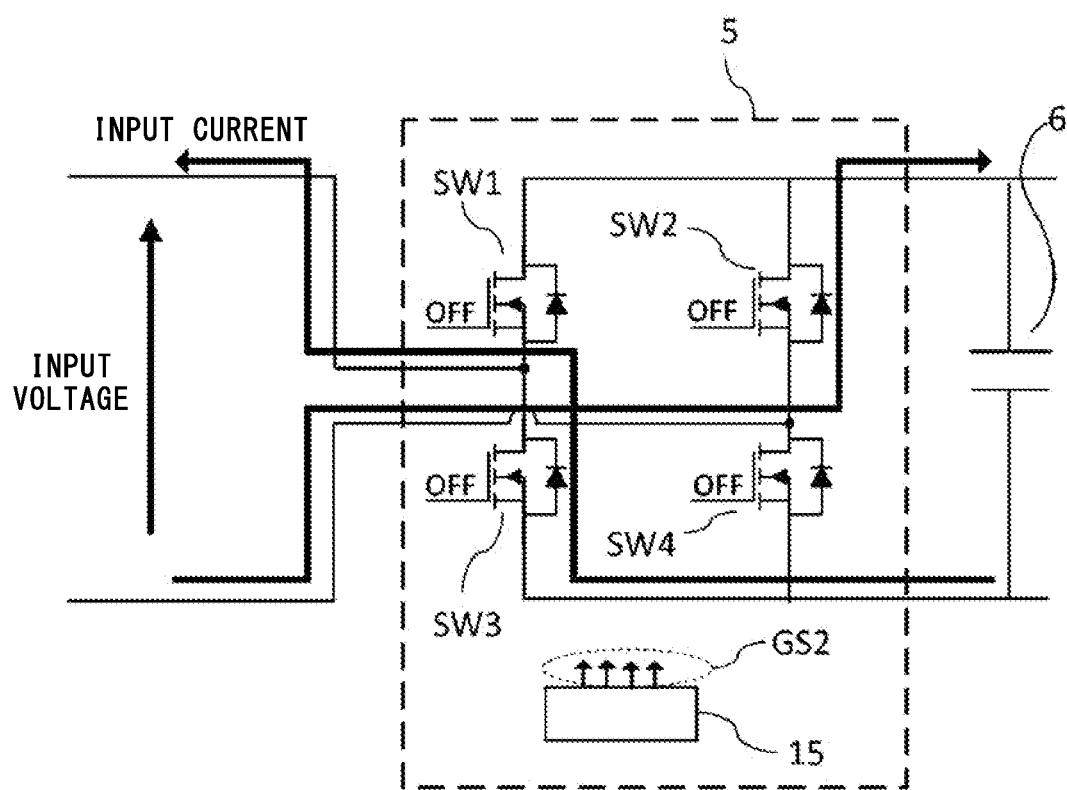
FIG. 8 illustrates operation states of the semiconductor switches and a flow of input current, in mode 2 in FIG. 6.

During a period of operation in mode 2 in FIG. 6, the semiconductor switches SW1 to SW4 are, as shown in FIG. 8, turned off so that current flows to the direction indicated by the arrow in FIG. 8. and the current flows to the output capacitor 6 and the load 10, in the same manner as in the control during a period shown in FIG. 5. The input voltage is kept at a predetermined value.

Figure 9:
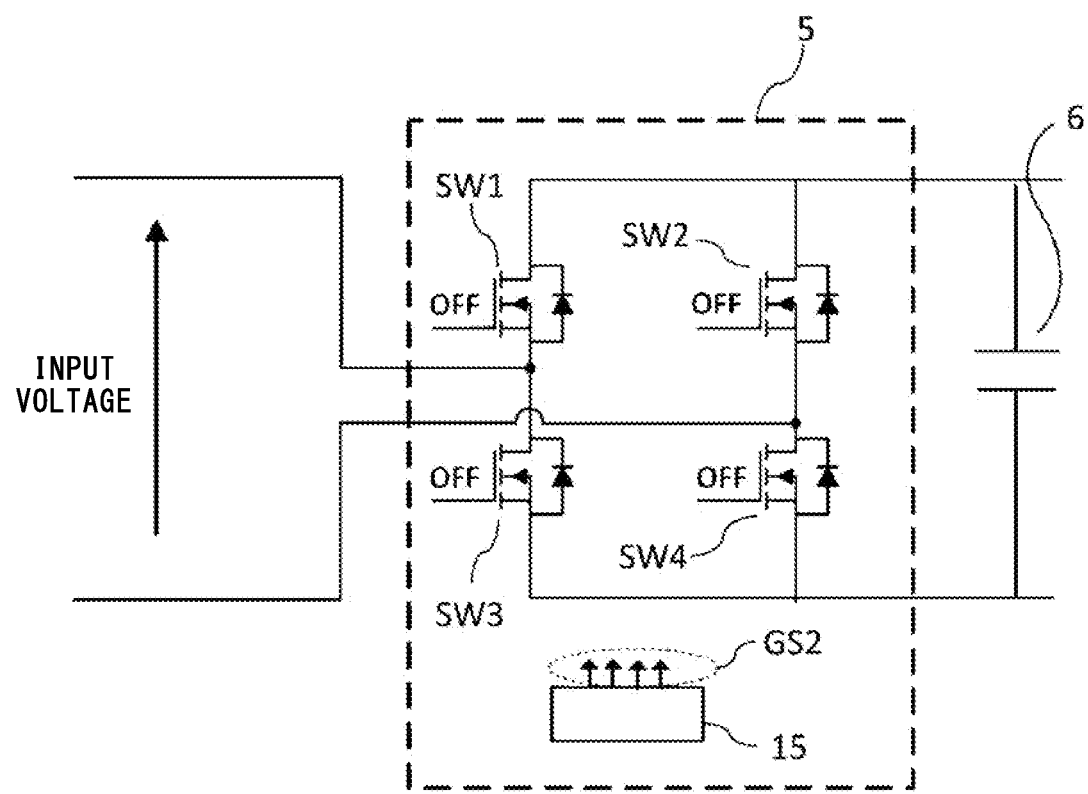
FIG. 9 illustrates operation states of the semiconductor switches and a flow of input current, in mode 3 in FIG. 6.

During a period of operation in mode 3 in FIG. 6, the semiconductor switches SW1 to SW4 are, as shown in FIG. 9, kept in an OFF state, and the input current is 0, in the same manner as in the control during the period shown in FIG. 5.

Figure 10:
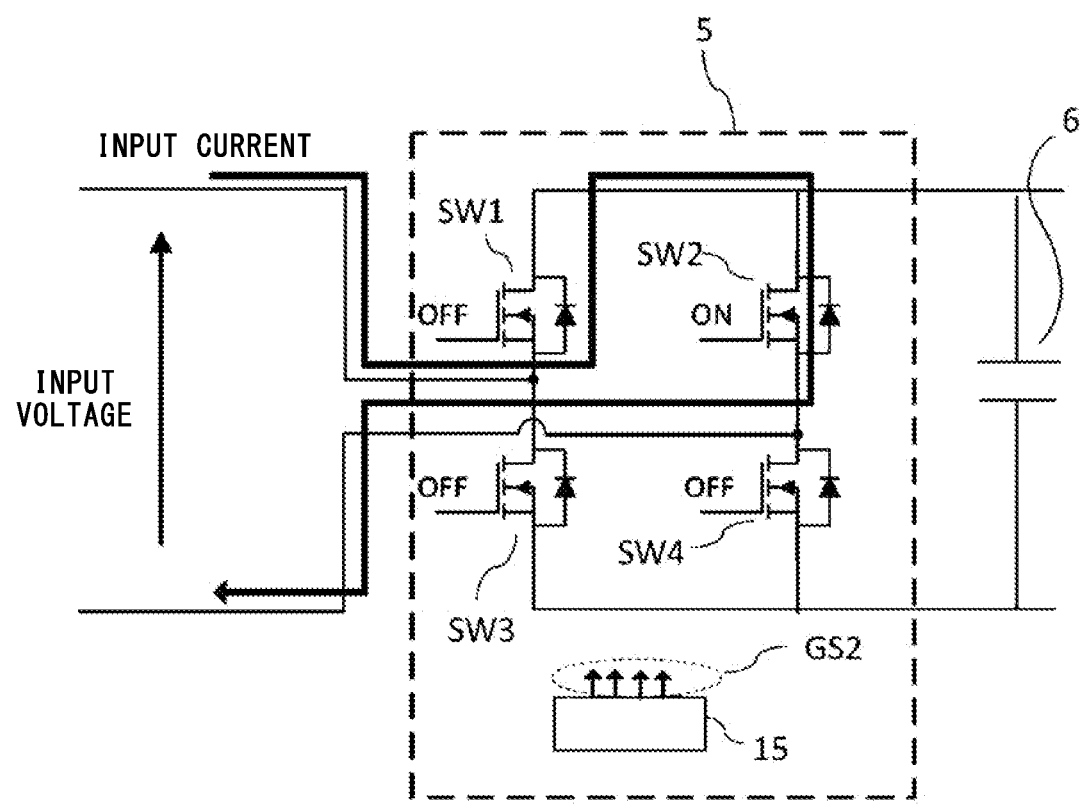
FIG. 10 illustrates operation states of the semiconductor switches and a flow of input current, in mode 4 in FIG. 6.
Figures 11, 12:
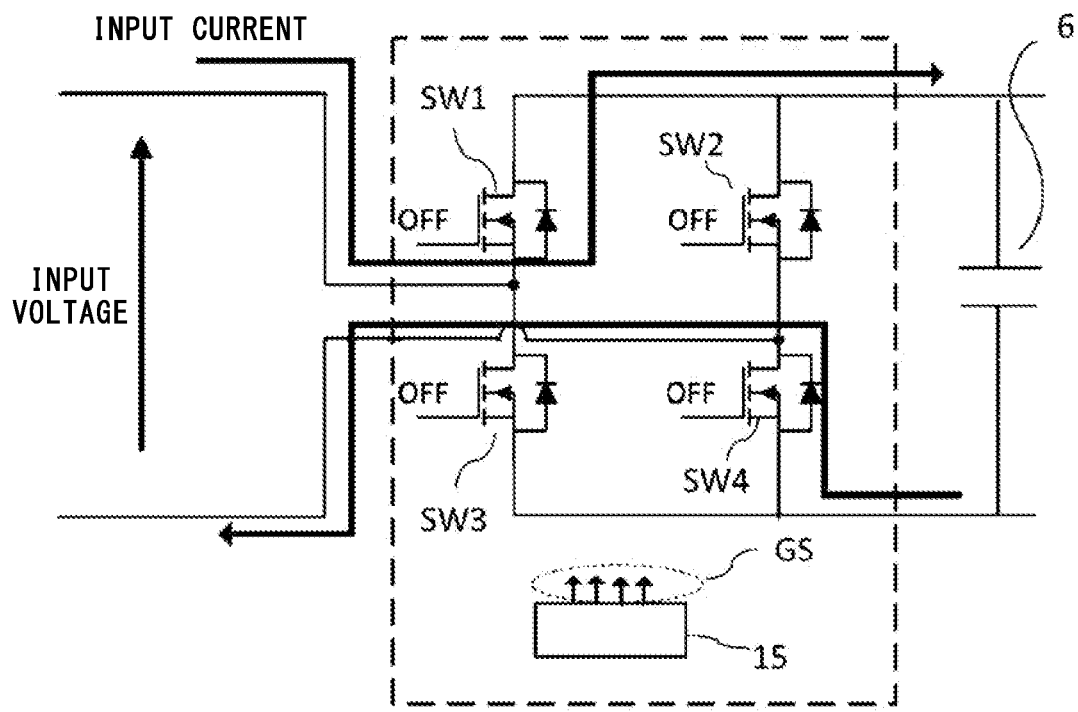
FIG. 11 illustrates operation states of the semiconductor switches and a flow of input current, in mode 5 in FIG. 6.
FIG. 12 illustrates a look-up table in which load current values and ON duties are associated with each other, in embodiment 1.

During a period of operation in mode 4 in FIG. 6, the same operation as that during the period in mode 1 is performed as shown in FIG. 10. However, since both voltage and current are inverted, the semiconductor switch SW2 is turned on in order to cause short circuiting for current from the coil 4. During a period in mode 5, as shown in FIG. 11, flow of input current is opposite to the flow in mode 2, but the other operations are the same.

In mode 1 or mode 4, the time during which the semiconductor switch SW1 or SW2 is ON and current to the output capacitor 6 is 0 (hereinafter, referred to as ON duty, with the unit thereof being %), is changed according to a load current value detected by the current sensor 8 which detects a load current. As the method for changing the ON duty according to the load current value, there is a method that involves creating, in advance, a look-up table in which load current values and ON duties are associated with each other.

ON duties at which the coil to coil efficiency becomes high are measured in advance for respective load current values in a simulation and an experiment, and these values are stored in the storage device 200 in the control device 15 or the like. This makes it possible to determine an appropriate ON duty from a given load current value. An example of the look-up table is indicated in FIG. 12. In this example, the ON duty is increased in a case of a low load current, to reduce input current of the receiving side AC/DC conversion circuit.

[Description of Details of Problem, and Necessity and Advantageous Effects of Present Disclosure]

Next, necessity and advantageous effects of the above-described method will be described in detail. In the non-contact power feeding, power transmission efficiency between the coils 3 and 4 is important, and there is a characteristic that the power transmission efficiency between the coils 3 and 4 significantly changes according to the load impedance.

Regarding household instruments, there is a case where several kilowatts are consumed by using a large-power instrument such as an air conditioner or an IH cooking heater, and meanwhile, a case where merely several hundreds of watts are needed by using only a lighting and a television, can also be assumed. If an air conditioner or an IH cooking heater is used and it is assumed that 3 kW of power is being outputted at 380V of load voltage, the load impedance is about 40Ω.

Figure 13:
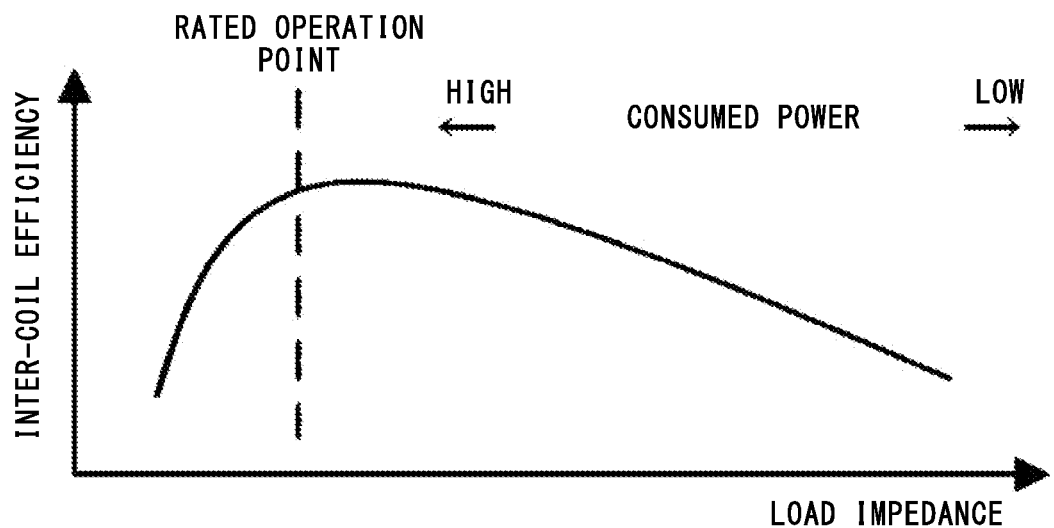
FIG. 13 is a diagram for explaining the characteristics of coil to coil efficiency and load impedance.

However, if required power decreases to, for example, 500 W, since the load voltage is fixed, the load impedance becomes about 250Ω which is equal to or more than six times 40Ω. Such change in the load impedance is not a preferable situation in non-contact power feeding. As indicated by the characteristics of coil to coil efficiency and load impedance in FIG. 13, change in the load impedance from a rated operation point causes significant decrease in the transmission efficiency between the coils.

If only momentary loss is considered, even when the efficiency decreases in a case of low load, the absolute value of the loss is small, and thus no major problem arises. However, power consumed in a household can be about 500 W or a lower consumed power except for the times when an air conditioner is used in midsummer and midwinter. Thus, in the case where power is supplied from an on-board battery to the house side by the non-contact power feeding system, it is necessary to assume a case where, in most times, operation is performed at a power that is significantly lower than a rated power.

The efficiency in the case of performing power transmission at a rated power of 3 kW is defined as being 90%, and the efficiency in the case of performing power transmission at a low load of 500 W is defined as being 60%. In the case where power is fed at 3 kWh from a 24-kWh on-board battery until the battery is completely used up, the loss is 2.4 kWh. Meanwhile, in the case of continuing the operation at 500 W, the loss is 9.6 kWh. Such a state is not preferable from the viewpoint of effective utilization of power and also an economical viewpoint. Therefore, it is necessary to perform power transmission with high efficiency even at low load and low power.

As the method for solving this problem, there is a method in which change in the load impedance is compensated for by a DC/DC converter connected to a receiving side, as described in Patent Document 1. However, loss in the DC/DC converter and increase in volume and cost occur. In addition, out of the DC/DC converter and an AC/DC converter on the receiving side, one converter controls transmission efficiency and the other converter controls load voltage (or power), and thus two converters are needed on the power receiving side.

Figure 14:
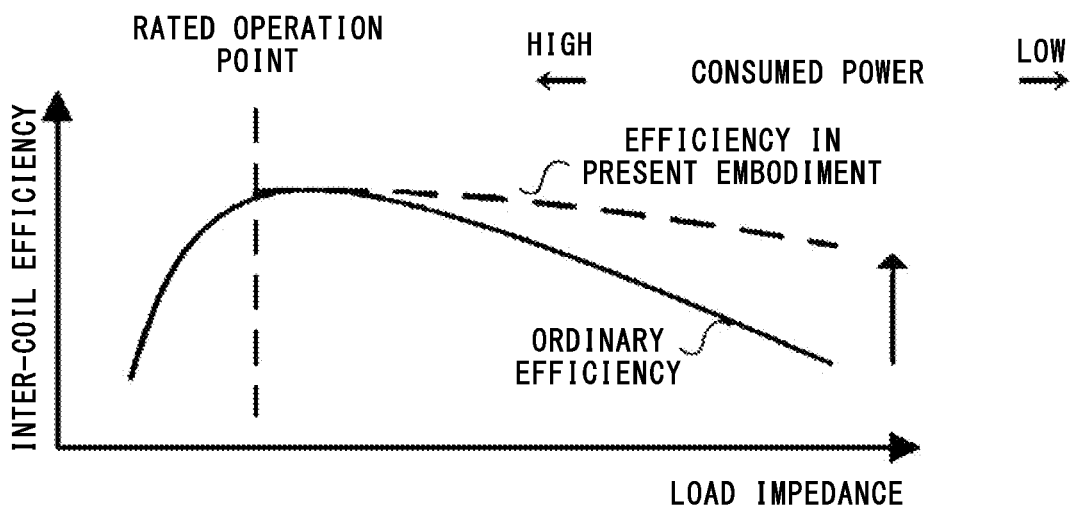
FIG. 14 illustrates the characteristics of coil to coil efficiency and load impedance in the case where the present embodiment is applied.

Meanwhile, the present disclosure has the following advantageous effects as shown in FIG. 14. The load voltage is controlled to be fixed by the transmitting side DC/AC conversion circuit 2, the ON time of the receiving side AC/DC conversion circuit 5 is manipulated under the condition that the load voltage is fixed, and the ratio of the input voltage to the input current (input voltage/input current) of the receiving side AC/DC conversion circuit 5 is reduced so that the load impedance that could increase in a case of low load is equivalently reduced, whereby power transmission can be performed with high efficiency without reducing the efficiency between the coils. By thus performing control, no DC/DC converter needs to be added on the receiving side. FIG. 14 illustrates the characteristics of coil to coil efficiency and load impedance in the case where the present embodiment is applied. The broken line in the drawing indicates improvement in the coil to coil efficiency in the case where the present embodiment is applied.

Embodiment 2

[Configuration]

Figure 15:
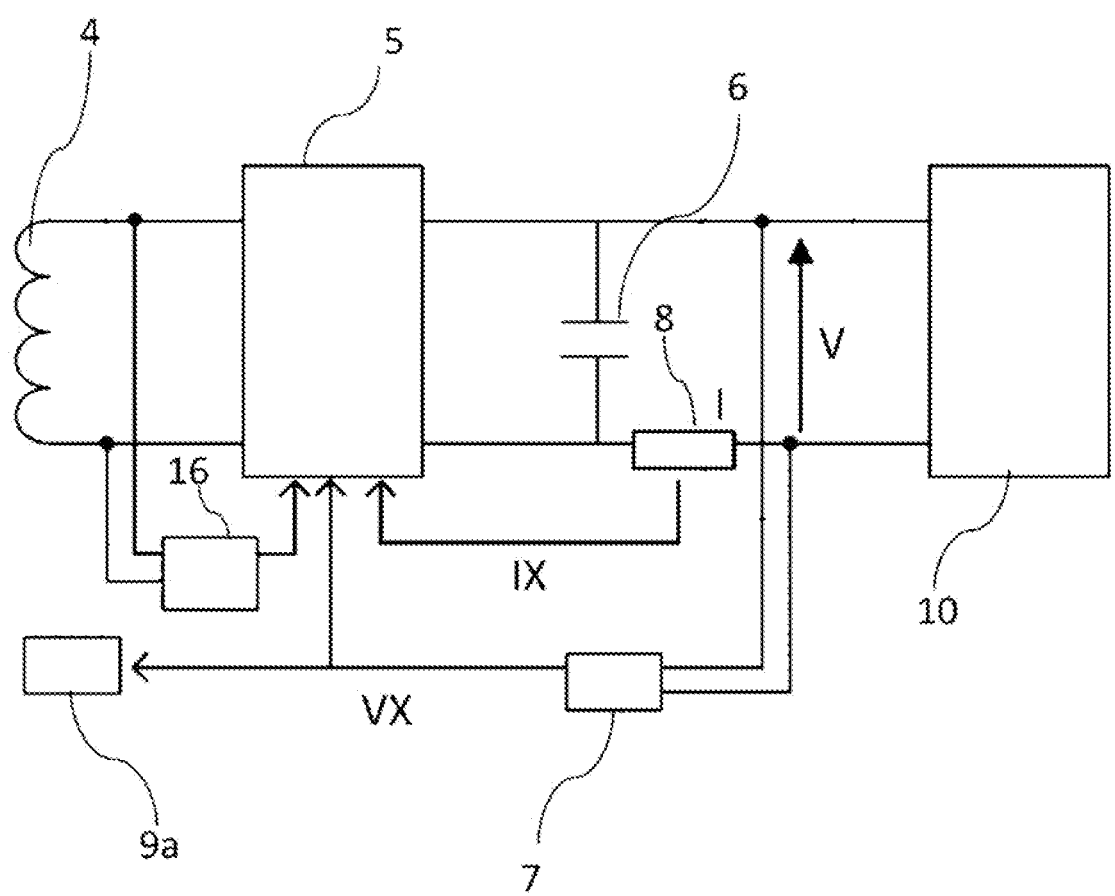
FIG. 15 illustrates the entire configuration of the power reception side of a non-contact power feeding system according to embodiment 2.

A basic configuration of embodiment 2 is the same as that of embodiment 1. The difference therebetween is that a voltage sensor 16 which detects inversion between positive and negative input voltages of the receiving side AC/DC conversion circuit 5, is provided. FIG. 15 shows the configuration of embodiment 2. In FIG. 15, only the receiving side portion is shown, and the transmitting side portion is not shown. The constituents denoted by the same reference characters as those in FIG. 1 have equivalent functions.

[Basic Operations]

Figure 16:
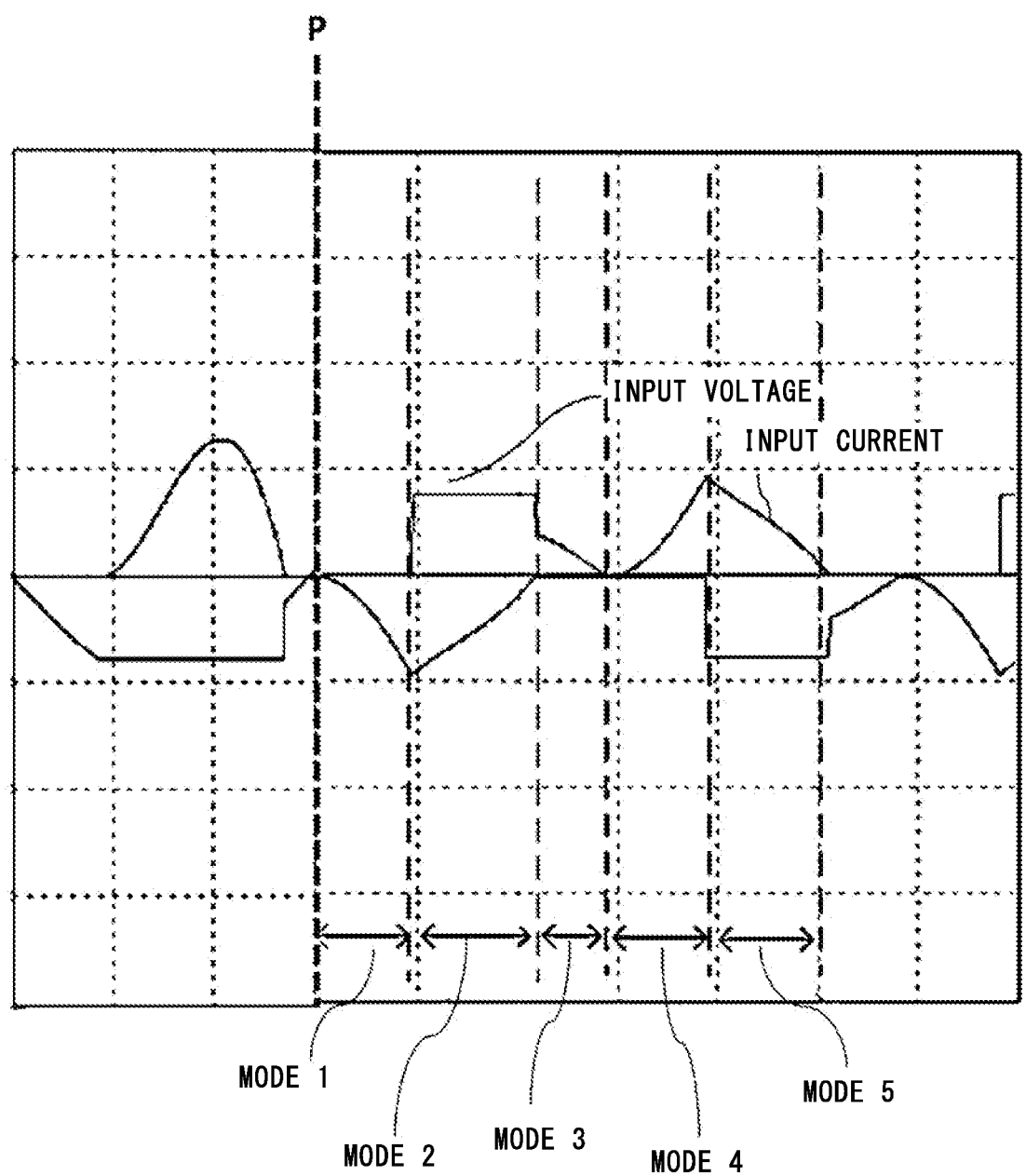
FIG. 16 is a waveform diagram indicating an input voltage waveform and an input current waveform to the power-reception-side AC/DC conversion circuit 5 in embodiment 2.

Basic operations of a non-contact power feeding system according to the present embodiment will be described. Regarding [Operation 1] and [Operation 2] described in embodiment 1, the same operations are performed also in the present embodiment. Regarding [Operation 3] described in embodiment 1, the timing at which at least one of the semiconductor switches of the receiving side AC/DC conversion circuit 5 is turned on, is indicated as a timing P in FIG. 16. The timing P is set to be the timing at which inversion between positive and negative input voltages of the receiving side AC/DC conversion circuit 5 occurs. This timing is detected by the voltage sensor 16 and inputted to the control device 15 in the receiving side AC/DC conversion circuit 5. The control device 15 causes the semiconductor switch SW1 to be turned on at this timing. Although the semiconductor switch to be turned on is the semiconductor switch SW1 in the present embodiment, the semiconductor switch may be any semiconductor switch that causes, when turned on, current to the output capacitor 6 to be 0.

[Description of Advantageous Effect of Present Embodiment]

In the non-contact power feeding system, the transmitting side DC/AC conversion circuit 2 and the receiving side AC/DC conversion circuit 5 are apart from each other, and thus it is difficult to synchronize the switching timings of the semiconductor switches which are present in the conversion circuits. Although information about the operation state of each semiconductor switch can be transmitted through wireless communication, a delay of several milliseconds occurs by the communication. The switching frequency of the transmitting side DC/AC conversion circuit 2 in the present embodiment is 80 kHz, with 1 cycle being about 12 μs. In order to synchronize the switching timings, a communication environment that involves a low delay not greater than the order of several hundreds of nanoseconds which is a time shorter than 12 μs, is required. Thus, it is difficult to achieve synchronization by existing wireless communication. Meanwhile, turning on semiconductor switches without achieving synchronization causes destabilization of operations, and thus is not desirable. Considering this, as in the present embodiment, the semiconductor switch SW1 is turned on by using, as a trigger, switching between positive and negative input voltages of the receiving side AC/DC conversion circuit 5. This leads to an advantageous effect of enabling switching, in a state of achieving synchronization, to be performed without using high-speed and low-delay wireless communication on the transmitting side and the receiving side, and enabling power transmission with high efficiency without any additional circuit even in a case of low load.

Embodiment 3

[Configuration]

Figure 17:
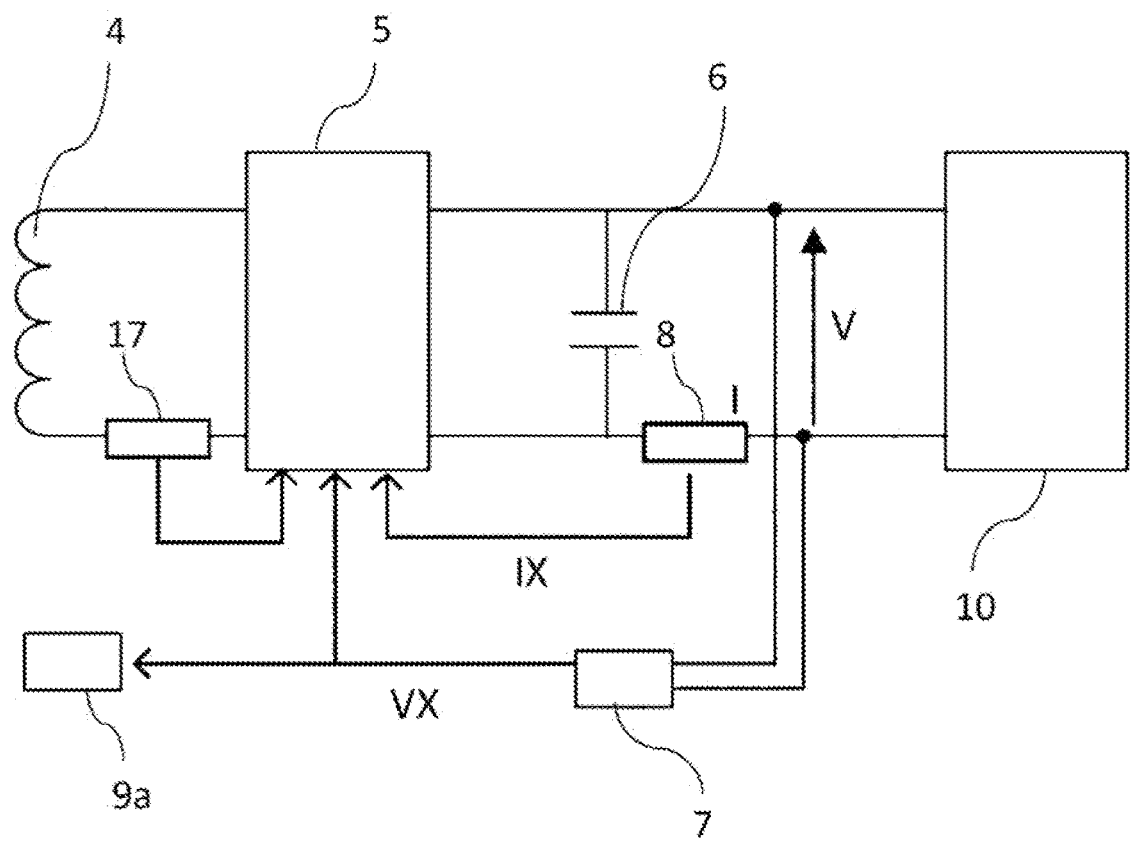
FIG. 17 illustrates the entire configuration of the power reception side of a non-contact power feeding system according to embodiment 3.

A basic configuration of embodiment 3 is the same as that of embodiment 1. The difference therebetween is that a current sensor 17 which detects inversion between positive and negative input currents of the receiving side AC/DC conversion circuit 5, is provided. FIG. 17 shows the configuration of embodiment 3. In FIG. 17, only the power receiving portion is shown, and the transmitting side portion is not shown. The constituents denoted by the same reference characters as those in FIG. 1 have equivalent functions.

[Basic Operations]

Figure 18:
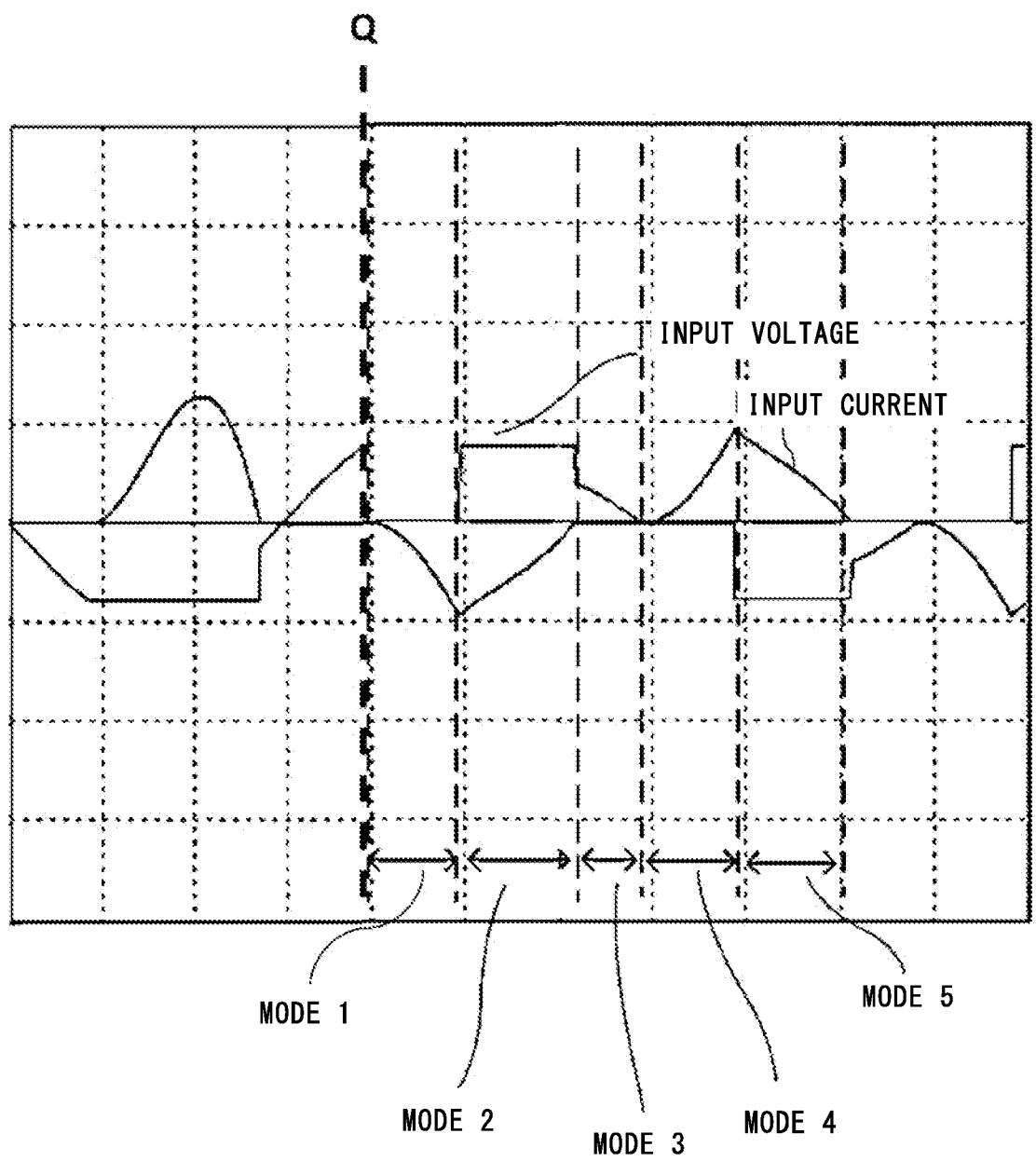
FIG. 18 is a waveform diagram indicating an input voltage waveform and an input current waveform to the power-reception-side AC/DC conversion circuit 5 in embodiment 3.

Basic operations of a non-contact power feeding system according to the present embodiment will be described. Regarding [Operation 1] and [Operation 2] described in embodiment 1, the same operations are performed also in the present embodiment. Regarding [Operation 3] described in embodiment 1, the timing at which at least one of the semiconductor switches of the receiving side AC/DC conversion circuit 5 is turned on is, as indicated by a timing Q in FIG. 18, set to be the timing at which switching between positive and negative input currents of the receiving side AC/DC conversion circuit 5 occurs. This timing is detected by the current sensor 17 and inputted to the control device 15 in the receiving side AC/DC conversion circuit 5. The control device 15 causes the semiconductor switch SW1 to be turned on at this timing. Although the semiconductor element to be turned on is the semiconductor switch SW1 in the present embodiment, the semiconductor switch may be any semiconductor switch that causes, when turned on, current to the output capacitor 6 to be 0.

[Description of Advantageous Effect of Present Embodiment]

Turning on the semiconductor switch by using, as a trigger, switching between positive and negative input currents of the receiving side AC/DC conversion circuit 5 as in the present embodiment leads to an advantageous effect of, in the same manner as in embodiment 2, enabling switching, in a state of achieving synchronization, to be performed without using high-speed communication on the transmitting side and the receiving side, and enabling power transmission with high efficiency without any additional circuit even in a case of low load.

Embodiment 4

[Configuration]

Figure 19:
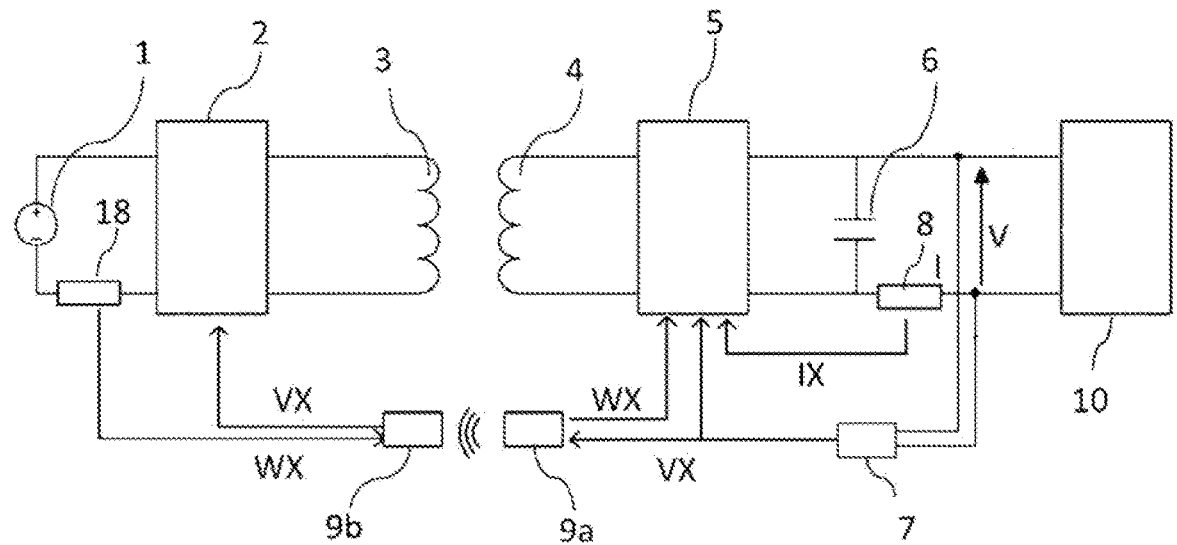
FIG. 19 illustrates the entire configuration of a non-contact power feeding system according to embodiment 4.

FIG. 19 shows a non-contact power feeding system according to the present embodiment. A basic configuration thereof is the same as that of the non-contact power feeding system according to embodiment 1. In addition to the basic configuration, the present embodiment has a configuration, with a sensor 18 for measuring input power of the transmitting side DC/AC conversion circuit 2, in which load voltage information VX on the receiving side is transmitted to the transmitting side and the transmitting side receives the load voltage information VX. The input power measured by the sensor 18 is inputted to the control device 15 of the receiving side AC/DC conversion circuit 5 via the wireless communication modules 9b and 9a.

[Basic Operations]

Basic operations of the non-contact power feeding system according to the present embodiment will be described. Regarding [Operation 1] and [Operation 2] described in embodiment 1, the same operations are performed also in the present embodiment.

The output voltage of the receiving side AC/DC conversion circuit 5 is kept fixed, and switching of the semiconductor switches SW1 to SW4 is performed at an ON duty of, for example, 5% under the condition that the load current is fixed. Thereafter, an input power Pin_1 of the transmitting side DC/AC conversion circuit 2 is measured by the sensor 18, and then the ON duty is set to 10%. Then, an input power Pin_2 of the transmitting side DC/AC conversion circuit is measured by the sensor 18 again.

The input power Pin_1 measured when the ON duty is 5% and the input power Pin_2 measured when the ON duty is 10%, are transmitted to the control device 15 via the wireless communication modules 9a and 9b and compared with each other by the control device 15.

If the input power Pin_2 is lower than the input power Pin_1, the ON duty is increased to 15%. If the input power Pin_2 is higher than the input power Pin_1, the ON duty is reduced to 5%. The operation of, in this manner, comparing the previous input power value and the present input power value with each other and continuing to increase the ON duty if the present input power value is lower or continuing to reduce the ON duty if the present input power value is higher, is repeated. Thus, the ON duty is controlled such that the input power is minimized. It is noted that although the input power is measured in the present embodiment, the same effect is obtained also by controlling the ON duty on the basis of a measurement value of output power of the transmitting side DC/AC conversion circuit 2.

[Advantageous Effect]

Figure 20:
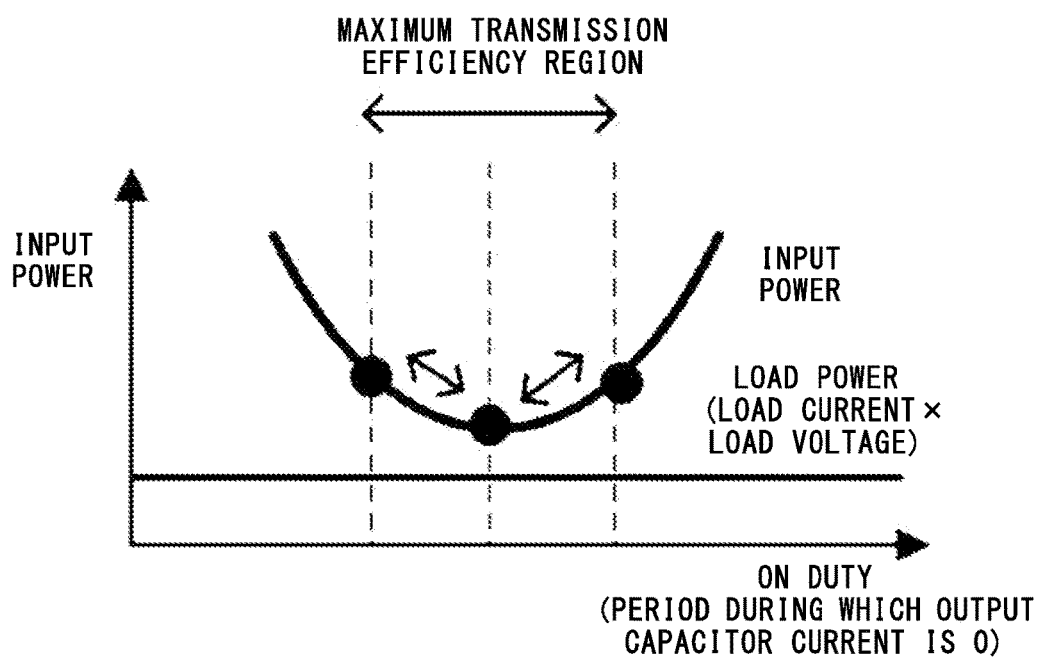
FIG. 20 illustrates the relationship between input power and load power in embodiment 4.

An operation condition that the input power is minimized as a result of the above-described basic operations can be regarded as a condition for maximizing the transmission efficiency (coil to coil efficiency), under the condition that the load power is fixed as shown in FIG. 20. Thus, it is possible to set an ON duty, at which the coil to coil efficiency is favorable, according to the load current without preparing in advance a look-up table such as one described in embodiment 1, in which load current values and ON duties are associated with each other.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS

1 DC power supply
2 transmitting side DC/AC conversion circuit
3 coil (first coil)
4 coil (second coil)
5 receiving side AC/DC conversion circuit
6 output capacitor
7 voltage sensor
8, 8a current sensor
9a, 9b wireless communication module
10 load
11 resonance capacitor
12 DC/AC conversion circuit
13 arbitrary electrical device
14, 15 control device
16 voltage sensor
17 current sensor
18 sensor

The invention claimed is:

1. A non-contact power feeding system comprising:
  a transmitting side DC/AC conversion circuit connected to an external power supply;
  a first coil connected to the transmitting side DC/AC conversion circuit;
  a second coil which transmits/receives power to/from the first coil by magnetic coupling;
  a receiving side AC/DC conversion circuit connected to the second coil;
  a capacitor connected to a DC output side of the receiving side AC/DC conversion circuit;
  a current sensor which measures current flowing to a load connected to the capacitor;
  a voltage sensor which measures a voltage of the connected load; and a communication device which transmits an output from the voltage sensor, to the transmitting side DC/AC conversion circuit, wherein the transmitting side DC/AC conversion circuit performs control such that the voltage of the load falls within a predetermined range, and the receiving side AC/DC conversion circuit performs, while the voltage of the load is being controlled to be within the range, control so as to generate a period during which current to the capacitor is 0, according to the current flowing to the load.

2. The non-contact power feeding system according to claim 1, wherein the receiving side AC/DC conversion circuit includes a plurality of semiconductor switches, and control is performed so as to turn on one or more of the semiconductor switches in response to switching between positive and negative input voltages of the receiving side AC/DC conversion circuit, to generate the period during which current to the capacitor is 0.

3. The non-contact power feeding system according to claim 2, wherein the period during which current to the capacitor is 0 is controlled on the basis of a look-up table in which the period is uniquely determined correspondingly to the current flowing to the load.

4. The non-contact power feeding system according to claim 2, further comprising a sensor which detects input power or output power of the transmitting side DC/AC conversion circuit, wherein the period during which current to the capacitor is 0 is controlled such that the input power or the output power detected by the sensor is minimized.

5. The non-contact power feeding system according to claim 4, wherein regarding the input power or the output power, a present detected power value and a previous detected power value detected by the sensor are compared with each other, and if the present detected power value is smaller than the previous detected power value, the period during which current to the capacitor is 0 is controlled to be increased, or if the present detected power value is larger than the previous detected power value, the period during which current to the capacitor is 0 is controlled to be reduced.

6. The non-contact power feeding system according to claim 1, wherein the receiving side AC/DC conversion circuit includes a plurality of semiconductor switches, and control is performed so as to turn on one or more of the semiconductor switches in response to switching between positive and negative input currents of the receiving side AC/DC conversion circuit, to generate the period during which current to the capacitor is 0.

7. The non-contact power feeding system according to claim 6, wherein the period during which current to the capacitor is 0 is controlled on the basis of a look-up table in which the period is uniquely determined correspondingly to the current flowing to the load.

8. The non-contact power feeding system according to claim 6, further comprising a sensor which detects input power or output power of the transmitting side DC/AC conversion circuit, wherein the period during which current to the capacitor is 0 is controlled such that the input power or the output power detected by the sensor is minimized.

9. The non-contact power feeding system according to claim 8, wherein regarding the input power or the output power, a present detected power value and a previous detected power value detected by the sensor are compared with each other, and if the present detected power value is smaller than the previous detected power value, the period during which current to the capacitor is 0 is controlled to be increased, or if the present detected power value is larger than the previous detected power value, the period during which current to the capacitor is 0 is controlled to be reduced.

10. The non-contact power feeding system according to claim 1, wherein the period during which current to the capacitor is 0 is controlled on the basis of a look-up table in which the period is uniquely determined correspondingly to the current flowing to the load.

11. The non-contact power feeding system according to claim 1, further comprising a sensor which detects input power or output power of the transmitting side DC/AC conversion circuit, wherein the period during which current to the capacitor is 0 is controlled such that the input power or the output power detected by the sensor is minimized.

12. The non-contact power feeding system according to claim 11, wherein regarding the input power or the output power, a present detected power value and a previous detected power value detected by the sensor are compared with each other, and if the present detected power value is smaller than the previous detected power value, the period during which current to the capacitor is 0 is controlled to be increased, or if the present detected power value is larger than the previous detected power value, the period during which current to the capacitor is 0 is controlled to be reduced.

13. A power reception device comprising:

a receiving side coil which transmits/receives, by magnetic coupling, power to/from a transmitting side coil connected to a transmitting side DC/AC conversion circuit;

an AC/DC conversion circuit connected to the receiving side coil;

a capacitor connected to a DC output side of the AC/DC conversion circuit; and a current sensor which measures current flowing to a load connected to the capacitor, wherein the AC/DC conversion circuit performs, while a voltage of the load is being controlled to be within a predetermined range by the transmitting side DC/AC conversion circuit, control so as to generate a period during which current to the capacitor is 0, according to the current flowing to the load.

* * * * *